(12) United States Patent  
Steinberg et al.

(10) Patent No.: US 7,941,020 B2  
(45) Date of Patent: May 10, 2011

(54) PHOTONIC CRYSTAL RESONATOR, A COUPLED CAVITY WAVEGUIDE, AND A GYROSCOPE

(75) Inventors: Ben-Zion Steinberg, Kfar Saba (IL); Amir Boag, Yavne (IL); Jacob Scheuer, Ramat Gan (IL)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 151 days.

(21) Appl. No.: 12/178,274

(22) Filed: Jul. 23, 2008

(65) Prior Publication Data

US 2009/0027754 A1    Jan. 29, 2009

Related U.S. Application Data

(60) Provisional application No. 60/951,623, filed on Jul. 24, 2007.

(51) Int. Cl.
*G02B 6/26* (2006.01)
*G02B 6/35* (2006.01)

(52) U.S. Cl. ............................... 385/50; 385/16; 385/32

(58) Field of Classification Search .................... None
See application file for complete search history.

(56) References Cited

U.S. PATENT DOCUMENTS

| 7,385,177 | B2 * | 6/2008 | Steinberg et al. | ........ 250/227.18 |
| 2006/0145063 | A1 * | 7/2006 | Steinberg et al. | ........ 250/227.18 |

OTHER PUBLICATIONS

Steinberg, "Rotating photonic crystals: A medium for compact optical gyroscopes," *Physical Review E*, pp. 056621-1-056621-7, 2005.
Scheuer et al, "Sagnac Effect in Coupled-Resonator Slow-Light Waveguide Structures," *Physical Review Letters*; pp. 053901-1-053901-4, 2006.
Steinberg et al, "Sagnac Effect in Rotating Photonic Crystal Micro-Cavities and Miniature Optical Gyroscopes," *Optical Society of America*, 2006.
Steinberg et al, "Splitting of microcavity degenerate modes in rotating photonic crystals—the miniature optical gyroscopes," *Optical Society of America B*, 2006.
Loncar et al, "High quality factors and room-temperature lasing in a modified single-defect photonic crystal cavity," *Optical Letters*, vol. 29, No. 2, pp. 721-723, 2004.
Post, "Sagnac Effect", *Reviews of Modern Physics*, vol. 39, No. 2, pp. 475-493, 1967.
Painter et al, "Defect modes of a two-dimensional photonic crystal in an optically thin dielectric slab," *Optical Society of America B*, vol. 16, No. 2, pp. 275-285, 1999.

(Continued)

*Primary Examiner* — Sarah Hahm
(74) *Attorney, Agent, or Firm* — Oliff & Berridge, PLC (57) ABSTRACT

A rotating optical resonator, a waveguide and a method of use of waveguide are disclosed. The rotating optical resonator may include at least two modes of different resonant frequencies shiftable towards each other by reducing a magnitude of rotation rate, said modes being joinable into a substantially degenerate mode by setting substantially zero rotation rate, said resonator being of an optical size smaller than five wavelengths of the substantially degenerate mode. The waveguide may include a plurality of coupled evenly degenerate split mode resonators, the split of the modes forming a stop band in a resonant band of the waveguide, the stop band of the waveguide thereby being changeable by changing an angular velocity of the waveguide while the vector of the angular velocity is non-parallel with respect to the waveguide.

47 Claims, 6 Drawing Sheets

OTHER PUBLICATIONS

Anderson et al, "Electromagnetic Radiation in Accelerated Systems," *Physical Review*, pp. 1765-1775, 1969.

Lancaster et al, *The Theory of Matrices*, Academic Press, 2$^{rd}$ Edition, 1985.

Arditty et al, "Sagnac effect in fiber gyroscopes," *Optics Letters*, vol. 6, No. 2, pp. 401-403, 1981.

Boag et al, "Narrow-band microcavity waveguides in photonic crystals," *Optical Society of America A*, vol. 18, No. 11, 2001.

Shiozawa, "Phenomenological and Electron-Theoretical Study of the Electrodynamics of Rotating Systems," *Proceedings of the IEEE*, vol. 61, No. 12, pp. 1694-1702, 1973.

Steinberg et al, "Propagation in photonic crystal coupled-cavity waveguides with discontinuities in their optical properties," *Optical Society of America B*, vol. 23, No. 7, pp. 1442-1450, 2006.

\* cited by examiner

PHOTONIC CRYSTAL RESONATOR, A COUPLED CAVITY WAVEGUIDE, AND A GYROSCOPE

FIELD OF THE INVENTION

This invention relates to photonic crystal resonators; coupled cavity waveguides; optical gyroscopes, such as those using the Sagnac effect; optical filters and switches.

LIST OF REFERENCES

[1] B. Z. Steinberg, "Rotating photonic crystals: A medium for compact optical gyroscopes," *Phys. Rev. E*, 056621-7 (2005).

[2] Scheuer and A. Yariv, "Sagnac effect in coupled resonator slow light waveguide structures," *Phys. Rev, Lett.*, 053901 (2006).

[3] B. Z. Steinberg, A. Shamir, and A. Boag, "Sagnac effect in rotating photonic crystal microcavities and miniature optical gyroscopes," CWL6, CLEO/QELS 2006, Long Beach, Calif.

[4] B. Z. Steinberg, and A. Boag, "Splitting of Micro-Cavity Degenerate Modes in Rotating Photonic Crystals—The Miniature Optical Gyroscopes," *J. Opt. Soc. Am. B*, (1), 142-151, January 2007.

[5] E. J. Post, "Sagnac Effect," Review *of Modern Physics* (2), 475-493 (1967).

[6] O. Painter, J. Vuckovic, and A. Scherer, "Defect modes of a two-dimensional photonic crystal in an optically thin dielectric slab," *J. Opt. Sock Am. B* (2), 275-285 (1999).

[7] M. Loncar, M. Hochberg, A. Scherer, and Y. Qiu, "High quality factors and room-temperature lasing in a modified single-defect photonic crystal cavity," *Optics Letters* (7), 721-723 (2004).

[8] T. Shiozawa, "Phenomenological and Electron-Theoretical Study of the Electrodynamics of Rotating Systems," *Proc. IEEE*, 1694-1702 (1973).

[9] L. Anderson and J. W. Ryon, "Electromagnetic Radiation in Accelerated Systems," *Phys. Rev.*, 1765-1775 (1969).

[10] H. J. Arditty and H. C. Lefevre, "Sagnac Effect in Fiber Gyroscopes," *Optics Letters*, (8), 401-403 (1981).

[11] A. Boag and B. Z. Steinberg, "Narrow Band Micro-Cavity Waveguides in Photonic Crystals," *J. Opt. Soc. Am. A* (11), 2799-2805 (2001).

[12] Ben Z. Steinberg and Amir Boag, "Propagation in photonic crystal coupled-cavity waveguides with discontinuities in their optical properties," *J. Opt. Soc. Am. B* (7), 1442-1450 (2006).

[13] P. Lancaster, and M. Tismenetsky, *The Theory of Matrices*, Academic Press, 2nd Ed., 1985.

BACKGROUND

Photonic crystal resonators, such as photonic crystal microcavities or, in other words, light-confining defects, may be used for various applications, for example, for light emitting or lasing. They also can be used in gyroscopes when arranged in a coupled resonator waveguide [1].

Coupled resonator waveguides (CRWs) or, in other words, coupled cavity waveguides (CCWs), are useful elements in various optical applications. CRWs in several aspects are different from typical waveguides. In classical systems, the phase accumulation due to propagation of light is essentially that of a plane wave or a fiber-optical mode. However, in CRWs, signal propagation is based on coupling (also referred to as hopping or tunneling) of light from one resonator (e.g. a microcavity) to the next resonator. Thus, in CRWs the propagation mechanism is quite different from that of a conventional fiber or laser resonator. The second important difference of CRWs from "plane wave" waveguides is associated with the dispersion relation and bandwidth of propagating light. In contrast to relatively weak dispersion and large bandwidth of plane waves or fiber optical modes, CRW propagation modes, constructed via interaction of the local tunneling (i.e. coupling) effects, are relatively narrow-band and possess a Floquet-Bloch-type character, when the CRW is of a periodic structure. These features of CRWs can be utilized, for example, in CRW devices implemented by defects in photonic crystals or by chains of ring resonators.

The Sagnac effect, in its original definition, is known as the relative phase shift between two beams of light that have traveled an identical curvilinear path in opposite directions in a rotating frame. The path is determined by the media (made therewithin). Phase accumulation for the beam co-directed with the rotation differs from the accumulation for the beam which is counter-directed with rotation. The Sagnac effect is used extensively in practice. For example, highly accurate and sensitive rotation measurement devices are designed based on this effect. In particular, for navigation modern fiber-optic gyroscopes, known as Sagnac interferometers, are often used.

The Sagnac effect occurring in slow-wave structures consisting of a set of coupled non-degenerate micro-cavities is described particularly in the article [1] of the inventor of the present patent application.

DESCRIPTION

There is a need in the art for novel photonic crystal resonators, for coupled cavity waveguides, for sensitive gyroscopes, optical filters and switches, and for photonic crystals devices in general. There is also a need in the art for devices with changeable (i.e. adjustable) properties. A novel technique is presented here, which has adaptations (versions and embodiments) useful for fulfilling these and other needs.

The technique utilizes coupled resonator waveguides (CRWs) with mode degeneracy. Photonic crystal resonators with degenerate modes were examined, and it was found that rotation effectively splits these modes into separate energy levels or frequencies. Photonic crystal resonators with two degenerate modes examined in detail and it was found that frequency splitting is proportional to a resonator rotation rate. Splitting was found to be a novel, non-traditional, manifestation of the Sagnac effect which applies to standing-wave resonators. Owing to symmetry properties of degenerate modes, in case of an even number of degenerate modes, the original degenerate frequency is not among frequencies of split modes; and in case of an odd number of degenerate modes the original degenerate frequency coincides (i.e. substantially coincides) with the middle frequency of split modes.

The existence of splitting and of the "standing wave Sagnac effect" was perceived in the course of a search for novel gyroscopes, while considering CRWs based on degenerate mode resonators, supposing that using such CRWs might allow to increase gyroscope sensitivity to rotation. A way was sought to increase sensitivity so as to compensate for its decrease that would be caused by gyroscope miniaturization. The splitting effect was found, mathematically, by developing and applying tight-binding theory for modes in a rotating CRW, i.e. in a non-inertial reference frame.

The standing-wave Sagnac effect should be present in small degenerate resonators of any type, not just in photonic crystal microcavities. It was considered that splitting would apply for example in such cases when the resonator optical length (i.e. size or optical size) is between five light wavelengths and three wavelengths; or when it is between three light wavelengths and one light wavelength; or when it is smaller than one light wavelength. The inventors also have considered that fabrication techniques available on the above-specified small scales differ from those available on a larger scale.

As a result of such splitting, a degenerate photonic crystal micro-cavity or defect can be used as a gyroscope. However, a single micro-cavity has a relatively small frequency split and sensitivity though. This is due to the micro-cavity's small radius. However, this low sensitivity can be useful when relatively large rotation rates and/or more sensitive resolution techniques are involved. The small size may be an advantage at large rotation rates, because small objects are less susceptible to stress under rotation. Using resonator of a miniature size thus allows providing an accurate and reliable gyroscope.

It should be noted, that the splitting effect, occurring in degenerate photonic crystal microcavity under rotation, can be also used for light emitting or lasing. The frequency split is controlled by rotation and therefore it can be adjusted when needed. Likewise, all resonating frequencies, in case of even degeneracy, or all but one resonating frequency, in case of odd degeneracy, may be adjusted by changing the rotation rate. This adjustability can be used in various applications, not only in those which rely on using light at all frequencies of split modes.

In addition to the above, the inventors studied wave propagation in rotating slow-light structures (i.e. CRWs) with mode degeneracy. It was found that rotation, in conjunction with the mode-degeneracy, effectively induces a structure with a dispersion relation being significantly different from dispersion relation of a resting CRW. It was shown that under rotation a stop-band appears in the center of the structure's transmission curve. A light signal, input into the structure and of a frequency in the structure's rotation-induced stop-band, decays approximately exponentially during the propagation. The effect of stop-band therefore may be used for light filtering or switching activated by rotation. The stop-band effect is present for standing-wave resonators as well as for traveling-wave resonators.

The slow-light structure's stop-band is changeable. In particular, it may be affected by a change of the structure's rotation speed. This allows providing an optical gyroscope with high, in some cases approximately exponential, sensitivity to rotation. The same stop-band effect may be used also for light switching and for adjustable light filtering. The slow-light structure's stop-band may be also changeable by applying or introducing a spatially-periodic stress.

The stop-band may disappear if the respective CRW is rested and reappear if the CRW is rotated. Such transition may be considered as a phase transition, somewhat similar to the Mott's metal—insulator transition. Within this analogy, the inventors have found a way to bring a CRW with degenerate modes into the "insulating" phase; have provided (or found) a novel waveguiding structure in the CRW's "insulating" phase; and have utilized the obtained waveguiding structure for the design of a novel gyroscope.

The stop-band effect is a novel effect. For example, in contrast to the conventional Sagnac effect, occurring only in curved waveguides, the stop-band effect occurs in both curved and straight waveguides. The stop-band effect can be characterized as a novel global coupling effect, appearing due to changes in coupling between degenerate modes in the rotated resonators, while the degenerate modes are undergoing splitting due to either novel standing-wave or known Sagnac effect.

The stop-band effect should be present in CRWs based on various degenerate mode resonators, either traveling-wave or standing-wave. A basic example of the traveling-wave resonator with degenerate modes is conventional optical fiber micro-ring. Typically, the degeneracy number of the micro-ring resonance is two. In the micro-ring one degenerate mode—ray propagates clockwise (CW) and a "symmetrical" to it mode—ray propagates counter-clock wise (CCW) (where appropriate, abbreviation "CCW" is used for "Counter-Clock Wise" in the rest of this document). The CW and CCW modes in an optical fiber micro-ring are classical. The inventors have considered, that in such a case the stop-band effect would apply for example to cases when the resonator optical length is larger than one hundred fifty light wavelengths, or between one hundred fifty and fifty light wavelengths; or when it is between fifty and twenty light wavelengths; or when it is between twenty and five light wavelengths. A disk resonator provides another example of a resonator with "classical" degenerate modes.

The inventors have considered the case of standing-wave resonator with degenerate modes in detail, using an example of a degenerate cavity defect in photonic crystal. It should be noted, that not every cavity defect has degenerate modes. If a photonic crystal cavity has degenerate modes, the modes, in general, are not light rays or traveling waves. Mathematical analysis and simulations, somewhat surprisingly, have shown that the rotation-induced stop-band effect is present in CRWs based also on standing-wave resonators. Thus, it was considered that the stop-band effect can be present in CRWs based on any type of resonators having degenerate modes.

The photonic crystal CRWs may have certain advantages over other type CRWs (e.g micro-ring CRWs). For instance, photonic crystal CRWs may require a smaller chip area. Photonic crystal CRWs also can be integrated with other devices. Photonic crystals and their defects can be two-dimensional or three-dimensional. Planar geometry, for example, has proven to be convenient for fabrication.

In some preferred embodiments a CRW's resonant frequency has an even number of degenerate modes. The stop-band effect, in such a case, is similar to the case of two degenerate modes. The degeneracy may be present at rest or at some small rotating frequency; in any case a change in the frequency would tend to split it and to generate a forbidden gap and forbidden (i.e. stop) band.

According to one broad aspect of the invention, there is provided an optical resonator for use by rotation. The resonator is of a relatively small size and includes at least two modes of different resonant frequencies. It should be understood that the optical size or length of resonator plays the role of the size of resonator in this patent application. The resonant frequencies (energies) of the modes are shiftable towards each other by reducing a magnitude of a resonator rotation rate, and joinable into a substantially degenerate mode by setting the substantially zero rotation rate. The relatively small size of the optical resonator may satisfy at least one of the following conditions:

(a) the relatively small size is between five and three light wavelengths;
(b) the relatively small size is between three wavelengths and one wavelength;
(c) the relatively small size is smaller than one light wavelength.

The optical resonator may be for example a defect in a photonic crystal.

According to another broad aspect of the invention, there is provided a waveguide including an arrangement of a plurality of coupled even-degenerate mode resonators. The coupling of the degenerate modes is such that it forms a forbidden gap in a resonant band of the waveguide and, accordingly, the waveguide has the forbidden gap in the resonant band. The forbidden gap is changeable by changing an angular velocity of the waveguide, the vector of the angular velocity being non-parallel with respect to the waveguide.

The waveguide may be characterized by at least one of the following:
 (a) the plurality of resonators comprises at least one relatively small size resonator described above;
 (b) the even degeneracy of said resonators equals two;
 (c) at least one of said resonators is a defect in a photonic crystal;
 (d) at least one of said resonators is a closed-loop resonator;
 (e) at least one of said resonators is a ring resonator
 (f) at least one of said resonators is a disc resonator;
 (g) a number of said resonators in said waveguide is two;
 (h) the waveguide is an open circuit;
 (i) the waveguide has an even number of resonators;
 (j) the waveguide has a straight segment of more than two resonators;
 (k) the waveguide is of a straight line shape;
 (l) the plurality of resonators comprises at least a pair of resonators configured for an enhanced coupling between clockwise and counter clockwise propagating modes.

According to another broad aspect of the invention, there is provided a waveguide for use in switching. The waveguide includes an arrangement of a plurality of coupled even-degenerate mode resonators, the coupling of the degenerate modes forms a forbidden gap fully covering a rest resonant band of the waveguide and forms a forbidden gap covering less than the rest resonant band at a certain rotation rate.

According to another broad aspect of the invention, there is provided a device including the provided waveguide, and at least one of:
 (a) a light source configured for emitting light and inputting light into the waveguide;
 (b) a light detector configured for detecting an intensity of light passed through the waveguide;
 (c) a rotation controller configured for rotating the waveguide with a desired angular velocity;
 (d) a processing unit, adapted for calculation of the waveguide transparency and/or the waveguide rotation rate, based on a intensity of light at an output of said waveguide and on input light spectral distribution.

The light source may be configured and operable for changing frequency of input light.

According to another broad aspect of the invention, there is provided a method of use of the provided waveguide for filtering of light. The method includes rotating the waveguide so as to make a desired stop-band within the waveguide's transmission band, thereby allowing, for light to be input into the waveguide and therein filtered, a preferential passage through the waveguide of light frequencies being outside of the desired stop-band relatively to light frequencies being inside the desired stop-band.

According to another broad aspect of the invention, there is provided a method of use of the provided waveguide. The method includes passing a light beam of a predetermined intensity and a certain frequency through the waveguide. The method allows detecting an intensity of the passed beam, determining a transparency property of the waveguide, and determining an angular velocity of the waveguide.

According to another broad aspect of the invention, there is provided a method of use of the provided waveguide. The method includes switching off or on a passage of light through the waveguide by changing an angular velocity of the waveguide.

According to another broad aspect of the invention, there is provided a method of fabrication of a waveguide having a forbidden gap in a resonant band. The method includes rotating a waveguide comprising an arrangement of a plurality of coupled degenerate mode resonators forming the resonant band, so as to change the coupling of the degenerate modes, the coupling forming the forbidden gap in the resonant gap.

According to another broad aspect of the invention, there is provided a waveguide including an arrangement of a plurality of coupled degenerate mode resonators; the coupling of the degenerate modes forms a forbidden gap in a resonant band of the waveguide. The waveguide thus has the forbidden gap in the resonant band, the forbidden gap being changeable by changing an angular velocity of the waveguide, the vector of the angular velocity being non-parallel with respect to the waveguide.

According to a broad aspect of the invention, there is provided a rotating optical resonator, including at least two modes of different resonant frequencies shiftable towards each other by reducing a magnitude of rotation rate, the modes being joinable into a substantially degenerate mode by setting substantially zero rotation rate, the resonator being of an optical size smaller than five wavelengths of the substantially degenerate mode.

The optical resonator may be of an optical size being between five and three wavelengths of the substantially degenerate mode.

The optical resonator may be of an optical size being between three wavelengths of the substantially degenerate mode and one wavelength of the substantially degenerate mode.

The optical resonator may be of an optical size being smaller than one wavelength of the substantially degenerate mode.

The optical resonator may be a defect in a photonic crystal.

According to another broad aspect of the invention, there is provided a waveguide including a plurality of coupled evenly degenerate split mode resonators, the split of the modes forming a stop band in a resonant band of the waveguide, the stop band of the waveguide thereby being changeable by changing an angular velocity of the waveguide while the vector of the angular velocity is non-parallel with respect to the waveguide.

According to yet another broad aspect of the invention, there is provided a waveguide for use in switching, the waveguide including a plurality of coupled even-degenerate mode resonators, the degenerate modes forming a forbidden gap fully covering a rest resonant band of the waveguide, the formed forbidden gap decreasing to less than said rest resonant band under a certain change in rotation rate, the waveguide thereby being enabled for operation as a switch.

The plurality of resonators may include an at least one resonator of the invention (or of Claim 1, or a rotating optical resonator, including at least two modes of different resonant frequencies shiftable towards each other by reducing a magnitude of rotation rate, the modes being joinable into a substantially degenerate mode by setting substantially zero rotation rate, the resonator being of an optical size smaller than five wavelengths of the substantially degenerate mode).

The even degeneracy of the resonators may be equal to two.

At least one of the resonators may be a defect in a photonic crystal.

At least one of the resonators may be a closed-loop resonator.

At least one of the resonators may be a ring resonator.

At least one of the resonators may be a disc resonator.

A number of the resonators in the waveguide may be two.

The waveguide may form an open circuit.

The waveguide may have an even number of resonators.

The waveguide may have a straight segment of more than two resonators.

The waveguide may be of a straight line shape.

The plurality of resonators may include at least a pair of resonators configured to have an enhanced coupling between clockwisely and counter-clockwisely propagating modes, the enhancement being considered relatively to a ring resonator of the same size as resonators of the pair.

The plurality of resonators may include at least a pair of resonators with parallel segments in a region of the coupling between them.

The plurality of resonators may include at least a pair of resonators with curved segments which curvatures smaller in a region of the coupling between the resonators than in other regions.

In a broad aspect of the invention, there is provided a device, including the waveguide of the invention and a light source configured to emit light and input light into the waveguide.

The light source may be configured to emit light of changing frequency.

In a broad aspect of the invention, there is provided a device, including the waveguide of the invention and a light detector configured to detect an intensity of light passed through the waveguide.

In a broad aspect of the invention, there is provided a device, including the waveguide of the invention and a rotation controller configured to rotate the waveguide.

In a broad aspect of the invention, there is provided a device, including the waveguide of the invention and a processing unit, adapted to calculate the waveguide transparency and/or the waveguide rotation rate, based on a intensity of light at an output of said waveguide and on an input light spectral distribution.

In a broad aspect of the invention, there is provided a gyroscope including the waveguide of the invention.

In a broad aspect of the invention, there is provided a switch including the waveguide of the invention.

In yet another broad aspect of the invention, there is provided a method of use of a waveguide including coupled evenly degenerate optical resonators, the method including rotating the waveguide so as to produce a stop-band within the waveguide's transmission band, the rotation resulting for at least one light frequency in a transmission coefficient being at least five times smaller than a transmission coefficient for said frequency at rest.

The transmission coefficient may be at least twenty times smaller than at rest.

The transmission coefficient may be at least hundred times smaller than at rest.

BRIEF DESCRIPTION OF THE DRAWINGS

To further clarify the above and other advantages and features of the present invention, and to further show how it may be carried out in practice, a more particular description of the invention will be rendered in the below detailed description, at times with reference to the appended drawings. It is appreciated that these drawings, when depict only particular embodiments of the invention, are not to be considered limiting its scope. Hence, the invention will be described and explained with additional specificity and detail through the use of the accompanying drawings in which:

FIGS. 3A and 3B relate to non-orthogonal modes and FIGS. 3C and 3D relate to orthogonalized modes;

DETAILED DESCRIPTION

Figure 1A:
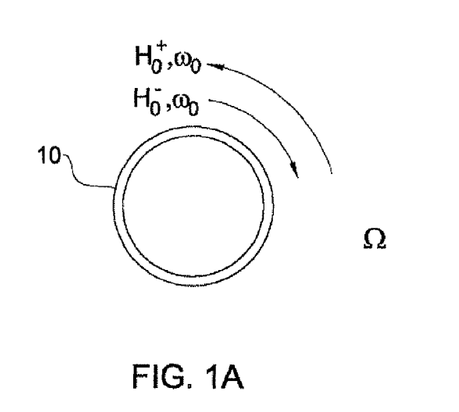
FIGS. 1A and 1B schematically show a micro-ring as an example of a doubly-degenerate resonator whose modes split under rotation.
Figure 1B:
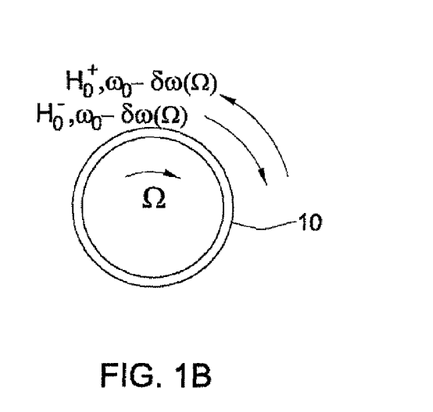

Referring to FIGS. 1A and 1B, there is shown an example of a resonator having degenerate modes, a micro-ring 10. In FIG. 1A this micro-ring is at rest. There are two electromagnetic modes in the micro-ring, CW and CCW, also denoted as $H_0^\pm$; they propagate in opposite directions while possessing the same resonance frequency $\omega_0$. In FIG. 1B this micro-ring rotates at an angular velocity $\Omega$ around an arbitrary axis normal to the ring plane. In other words, the angular velocity $\Omega$ is a normal to the ring plane component of the total angular velocity. The rotation results in splitting of the resonant frequency $\omega_0$ into two frequencies $\omega_\pm = \omega_0 \pm \Omega \omega_0 R/nc$, due to the classical Sagnac effect. Herein n is a refractive index of the waveguide medium and c is the speed of light in vacuum, R is the radius of the micro-ring. The two frequencies $\omega_\pm$ are resonant frequencies of split electromagnetic modes $H_0^\pm$.

Although it would seem less transparent, according to the research of inventors, splitting is to occur in any micro-cavity that supports mode degeneracy, including photonic-crystal micro-cavities. The splitting formula is in some aspects different and more general than the classical formula.

Figure 2:
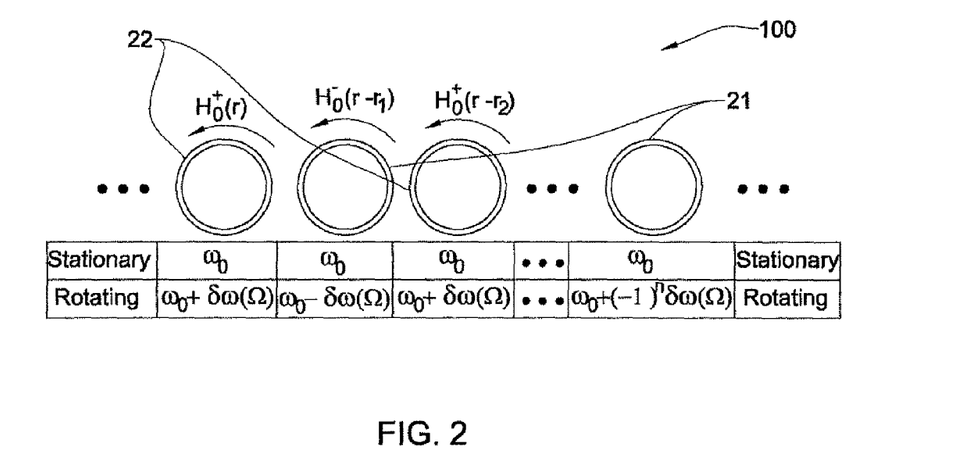
FIG. 2 schematically shows an example of a coupled resonator waveguide whose degenerate resonator modes split under rotation.

Referring to FIG. 2, there is shown a CRW 100 consisting of degenerate mode micro-ring resonators, odd numbered, generally at 21, and even-numbered, generally at 22. For the sake of simplicity, it is assumed that all resonators have the same resonance $\omega_0$. When CRW 100 is at rest, the CCW mode $H_0^+$ in even numbered resonators couples to the CW mode $H_0^-$ in odd numbered resonators (due to phase-matching requirement in the area between the resonators). However, when the entire structure rotates, each micro-ring undergoes a split of its resonant frequencies, as shown in FIGS. 1A and 1B. Thus, the relevant resonant frequency of the n-th resonator shifts to $\omega_0+(-1)^n\delta\omega(\Omega)$, and the rotation induces a periodic modulation of the CRW's properties. This rotation-dependent effective periodic modulation results in the emergence of a forbidden frequencies gap within the CRW's transmission curve: the phenomenon of forbidden gap is pertinent to equations with periodic coefficients. It was thus concluded that a super-structure with a forbidden gap may emerge in every CRW based on degenerate resonators.

The forbidden gap in various CRWs was studied analytically and was demonstrated numerically. It was shown that the rotation inducement of the forbidden gap within a CRW's transmission curve can provide a regime in which propagating through CRW light exponentially decays. Thus, the forbidden gap, obtained by the inventors, can be used for designing new devices with exponential-type sensitivity to rotation and to the CRW length. This has important practical implications for example for optical filters, switches, and gyroscopes.

The inventors analyzed the CRW in the rotating CRW rest frame, in which the CRW is accordingly always at rest, by using a set of Maxwell's equations valid in non-inertial non-relativistically rotating media. Appropriate wave equations were derived which were then solved using the tight-binding approach. The latter approach is not the only possible one, but it is well suited for CRW structures consisting of weakly coupled resonators, which is a case of interest allowing didactic consideration. With respect to the tight-binding approximation, it was considered that the basic properties of the novel forbidden gap effect, as well as many of the computational results pertaining to the new dispersion relations, are in principle valid beyond the chosen approximation. It should be noted, that the tight binding approach can be used where micro-cavities modes cannot be described by a simple local plane wave. Choosing the tight-binding approach has simplified the analysis, because many of the useful involved quantities have been expressed in terms of the CRW basic building block—a single isolated and resting micro-cavity. Other mathematical approaches, such as the matrix transfer method [2], could provide solutions that would be valid beyond the tight-binding regime. However, it should be noted that for example the matrix transfer method would result in a solution limited to traveling-wave resonators and "beam-type" modes. The tight-binding approach is valid where the transfer matrix approach and some other approaches would not be readily applicable.

As the tight-binding approach is based on the properties of a single rotating micro-cavity or resonator, the inventors used analysis methods similar to those published in [3, 4]. A summary of the points of the used methods is provided in this patent application wherever needed. Publications [3, 4] are incorporated herein by reference.

It should be understood that though the rotating CRW was analyzed by comparing it with a resting CRW, a device based on the rotating CRW will not need to rest to be utilized. It is just convenient for the analysis to refer at times to the non-rotating inertial system of reference; this comparison helps to convey physical interpretations concerning CRW behavior.

The further text of the detailed description is split into several sections for convenient reading.

Degenerate Modes in a Single Resting and Rotating Micro-Cavity:

Before analyzing the effect of rotation on the entire structure of a CRW consisting of degenerate micro-cavities, it is instructive to consider the effect of rotation on a single degenerate mode micro-cavity. To this end, the main points of publication [4] are herein emphasized.

First, the micro-cavity at rest is considered. The wave equation for magnetic field modes of a general resonator supporting M degenerate modes that resonate at frequency $\omega_0$ is used; phasors of these degenerate modes are denoted by $H_0^{(m)}(r)$, m=1, 2, ... M. The wave equation takes the following form:

$$\Theta_d H_0^{(m)}(r) = k_0^2 H_0^{(m)}(r), k_0=\omega_0/c, m=1, 2, \ldots, M. \quad (1.1)$$

where $\Theta_d$ is a wave operator:

$$\Theta_d \equiv \nabla \times \frac{1}{\varepsilon_d(r)} \nabla \times \quad (1.2)$$

Here $k_0=\omega_0/c$, c is the vacuum speed of light, and $\varepsilon_d(r)$ is the relative dielectric structure of the single resonator. Often there are only two degenerate modes, so that M=2. For example, two degenerate modes are typically the only modes of a ring resonator.

Considering the two degenerate modes of the ring resonator, they can be cast in many different ways. With the use of an arc length along the ring periphery denoted as s and the respective propagation constant (wave number) denoted as $\beta$, the two modes can be presented as proportional to $\cos(\beta s)$ and $\sin(\beta s)$. The two modes are then presented as standing waves. Alternatively, the two modes can be presented as two propagating waves. In this case they are proportional to $e^{i\beta s}$ and $e^{-i\beta s}$. Since any linear combination of degenerate modes is by itself a degenerate mode, the standing waves and running waves representations are formally equally legitimate, as well as legitimate are infinitely many other linear combinations. However, the propagating waves representation ($e^{\pm i\beta s}$) is signified by the fact that the modes' spatial forms are unchanged under rotation. Only propagating modes' resonant frequencies are changed to $\omega_\pm=\omega_0\pm\Omega\omega_0 R/nc$, due to the Sagnac effect. Thus, for a ring structure, the specific form $e^{\pm i\beta s}$ constitutes rotation eigenmodes; their phasors are denoted as $H_\Omega^\pm$.

The inventors have contemplated, that an invariant to rotation basis should exist in other resonators supporting mode degeneracy, even if their corresponding modal shapes are not as simple as those of the ring. This relates, in a particular case, to degenerate micro-cavities formed by local defects in photonic crystals. Considering, for example, a resting (i.e. stationary) cavity possessing two degenerate modes with phasors $H_0^{(1,2)}$, these phasors without loss of generality can be assumed real and mutually orthogonal. Indeed, every linear combination of degenerate modes is a degenerate mode; thus, one always can build a pair of orthogonal modes from a pair of non-orthogonal fields using for example Gram-Schmidt orthogonalization. Based on the two real and mutually orthogonal phasors, two phasors for the rotation eigenmodes are built:

$$H_\Omega^\pm = \sum_{m=1}^{2} a_m^\pm H_0^{(m)}, \; a_2^\pm = \pm i \frac{\|H_0^{(1)}\|}{\|H_0^{(2)}\|} a_1^\pm \quad (1.3)$$

Here script "±" attains only one value from "+" and "−" at a time.

The rotation eigenmodes possess the following important properties pertaining to both the stationary and the rotating cavity;

(i) they are orthogonal;

(ii) they constitute degenerate modes of a resting system, because they are given by linear combinations of degenerate modes of the resting system described by Eq. (1.1); their phasors satisfy $$\Theta_d H_\Omega^\pm(r) = k_0^2 H_\Omega^\pm(r); \quad (1.4)$$

(iii) they are themselves rotating fields—similarly to ring eigenmodes $e^{\pm i\beta s}$ (this is seen from the $\pi/2$ phase difference between the summated terms in Eq. (1.3));

(iv) their spatial form stays unchanged under physical rotation of the system (as seen in the rotating system frame);

(v) under rotation, their corresponding resonance frequencies as measured in the rotating system rest frame are obtained by a splitting formula $$\omega_\pm = \omega_0 \pm \delta\omega(\Omega), \; \delta\omega(\Omega) = \omega_0 \Omega \Lambda, \quad (1.5)$$

where $\Omega$ is the rotation angular speed, and $\Lambda$ is an eigenvalue of an appropriate rotation operator (the operator may be learnt from publication [4] incorporated herein by reference);

(vi) they constitute eigenmodes of the wave equation governing electromagnetic fields in the rotating system rest frame, with eigenvalues given by the above splitting formula; properties (iv)-(v) are special manifestations of this general fact.

The above properties (i)-(vi) are general and hold for any micro-cavity with mode degeneracy. Furthermore, for non-relativistic rotations the above properties hold for all location of the rotation axis. In the case of a simple closed loop resonator, they may be related to the classical Sagnac effect.

EXAMPLE 1

Modes of a two-dimensional photonic crystal (PhC) were found by simulation. The crystal consisted of dielectric cylinders of radius 0.6 μm and dielectric constant $\in_r = 8.41$, and was situated on a hexagonal lattice of a constant a=4 μm. For TM polarization, a micro-cavity with two degenerate modes at a resonant wavelength of $\lambda_0 = 2\pi c/\omega_0 = 8.79941$ μm is created by increasing a radius of a single cylinder to 1.1 μm. In FIGS. 3A-3D there are illustrated two pairs (couples) of degenerate modes for this doubly-degenerate TM micro-cavity (M=2). In all figures the dielectric cylinders are seen as circles C.

Figure 3A:
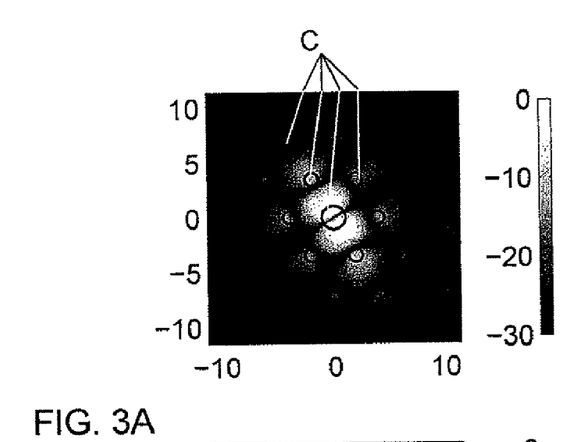
FIGS. 3A-3D illustrate on a logarithmic (dB) scale an electric field magnitude spatial distribution for two pairs of phasors for a doubly-degenerate TM photonic crystal microcavity.
Figure 3B:
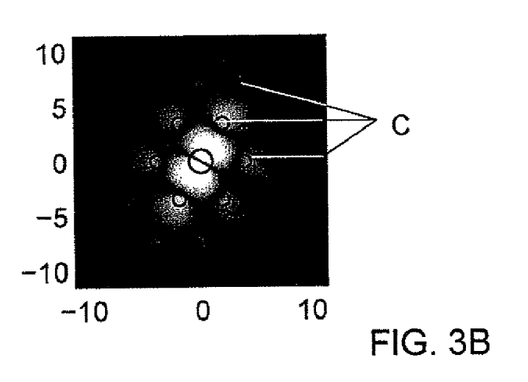

In particular, in FIGS. 3A and 3B there are respectively illustrated two phasors forming a pair of non-orthogonal degenerate modes. Specifically, in FIGS. 3A and 3B there are illustrated spatial distributions of magnitudes of electric field of phasors $E_0^{(1)}$ and $E_0^{(2)}$. The magnitudes are drawn by white color intensifying in a logarithmic (dB) scale. The distribution of electric field magnitude for phasor $E_0^{(2)}$ is a $\pi/3$-rotated replica of the distribution of electric field magnitude for phasor $E_0^{(1)}$. Magnetic fields of the non-orthogonal modes are not illustrated.

Figure 3C:
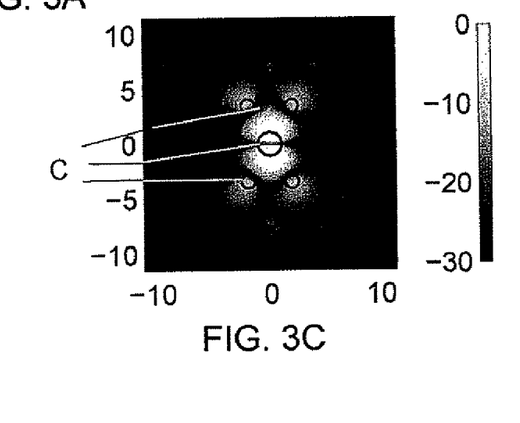
Figure 3D:
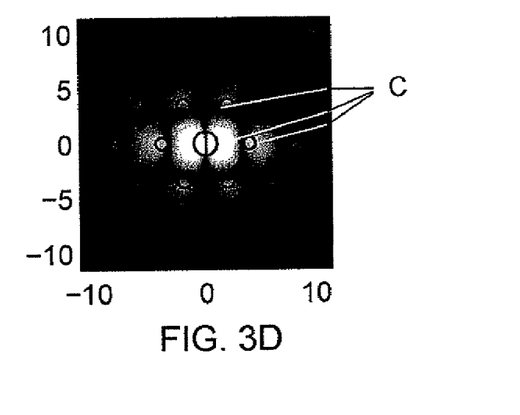

In FIGS. 3C and 3D there are respectively illustrated two phasors forming a pair of orthogonal degenerate modes. Specifically, in FIGS. 3C and 3D there are shown spatial distributions of electric field magnitudes of the phasors $E_0^{(1)} + E_0^{(2)}$ and $E_0^{(1)} - E_0^{(2)}$. The latter phasors are real.

From the second pair of phasors, i.e. from the pair of real and mutually orthogonal phasors, desired rotation eigenmodes are obtained. To this end, phasors of the rotation eigenmodes are obtained by Eq. (1.3) (the latter is applicable for electric as well as magnetic fields), and then, the implied time dependence $e^{i\omega_0 t}$ is reintroduced. Electric fields of rotation eigenmodes correspond to real parts of the eigenmodes and therefore evolve in time (they have been constructed by inventors to evolve in time). For the clockwise rotating mode, a distribution of magnitude of electric field evolves from a shape shown in FIG. 3C to a shape shown in FIG. 3D in a quarter of the rotation period $2\pi/\omega_0$ defined by the resonant frequency $\omega_0$.

Figure 4A:
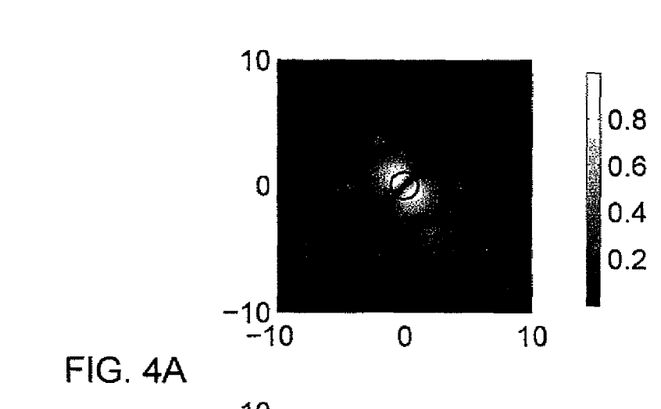
FIGS. 4A-4B illustrate on a linear scale instant spatial distributions of electric field magnitude for two rotation eigenmodes in a photonic crystal microcavity.
Figure 4B:
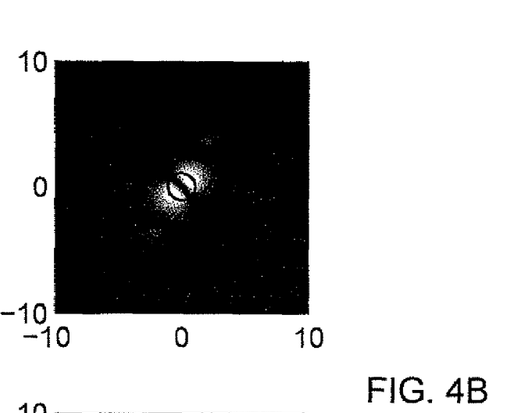

In FIGS. 4A-4B spatial distributions of instantaneous electrical field magnitudes of two rotation eigenmodes are illustrated. In particular, in FIG. 4A there is shown an instantaneous field magnitude $|\Re\mathrm{e}(E_\Omega^- e^{i\omega_0 t})|$ at phase $\omega_0 \pi/4$; in FIG. 4B, there is illustrated an instantaneous field magnitude $|\Re\mathrm{e}(E_\Omega^+ e^{i\omega_0 t})|$, at the same phase. The magnitudes are illustrated on a linear scale. The distributions have identical spatial forms. The rotation eigenmodes rotate around the cavity center in mutually opposite directions: a mode built on phasor $E_\Omega^+$, $H_\Omega^+$ rotates clockwise, a mode built on phasor $|E_\Omega^-$, $H_\Omega^-$ rotates counter-clockwise.

Figure 4C:
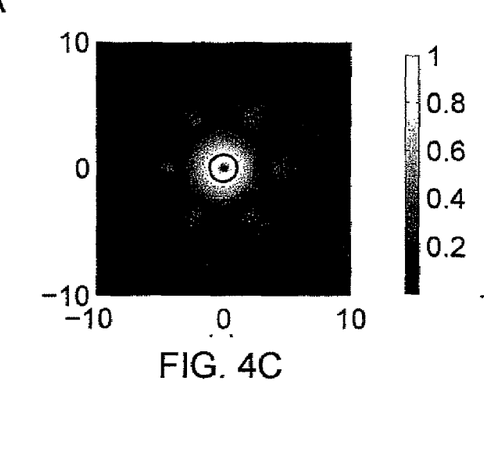
FIGS. 4C and 4D illustrate the rotation eigenmodes power flow.
Figure 4D:
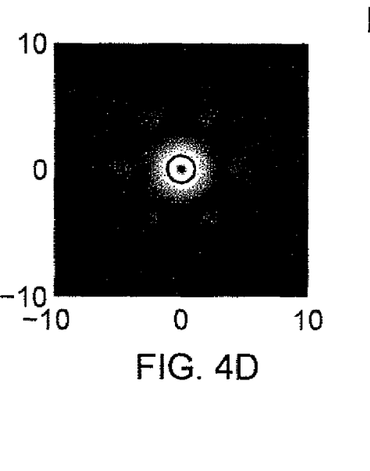

In FIGS. 4C and 4D there are shown magnitudes $|E_{\Omega-}|$ and $|E_{\Omega+}|$ of rotating modes' phasors, respectively. These magnitudes are indicative of power flow in the resonator. It is seen that the power flows around the center of the photonic crystal cavity, as this area is dark.

Rotating CRW in its Rest Frame of Reference:

If two neighboring micro-cavities of the type, whose rotation eigenmodes were studied above with reference to FIGS. 3A-3D and 4A-4D, are created in a photonic crystal, the clockwise rotating mode in one cavity couples best to the counter-clockwise rotating mode of its neighbor. The inventors have considered propagation of light through a one-dimensional array of coupled degenerate microcavities.

Figure 5:
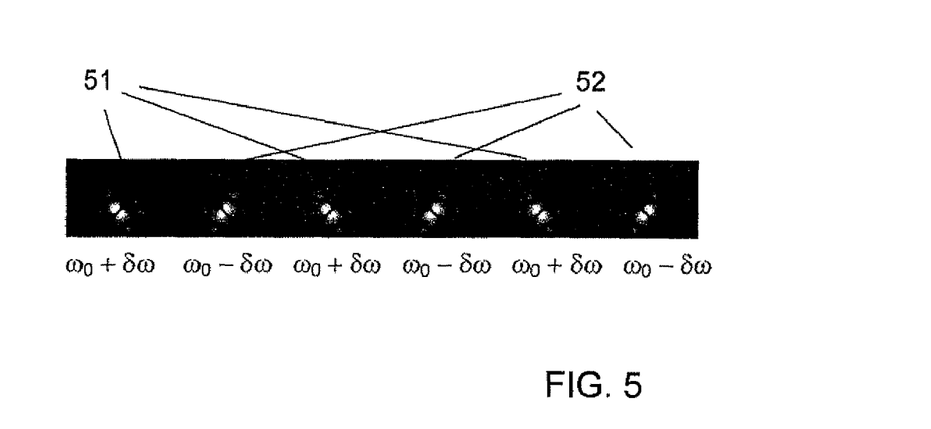
FIG. 5 illustrates an instantaneous field distribution of coupled modes in a photonic crystal coupled cavity waveguide.

For simulations, an exemplary photonic crystal coupled resonator waveguide (PhC-CRW) structure was used, formed by a set of equally spaced-apart micro-cavities distributed along a straight line. Each of the micro-cavities supported two degenerate modes at the same frequency, at rest. The spatial distribution of instantaneous field of degenerate modes of the exemplary PhC-CRW is illustrated in FIG. 5. Counting from left, the modes in the odd-numbered cavities, which are generally at 51, rotate in a counter clockwise direction. The modes in the even-numbered cavities, which are generally at 52, rotate in a clockwise direction. Other modes, that would rotate clockwise in odd-numbered cavities and counter clockwise in even-numbered cavities, are not excited by light input. A rigid mechanical rotation of the entire structure in the clockwise direction shifts each defect's resonance frequency by a shift of magnitude $\delta\omega$. This magnitude of the resonance shift increases linearly with the rotation rate, as in Eq. (1.5). However, the resonance frequency shift changes sign from one defect (i.e. resonator) to the next defect (i.e. resonator). Thus, rotation induces a modulation of the local resonance frequency.

Figure 10:
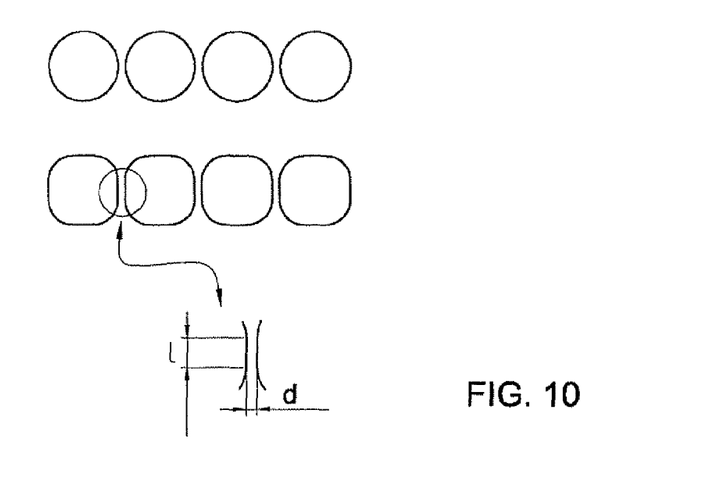
FIG. 10 illustrates a pair of resonators configured for an enhanced coupling between clockwise and counter clockwise propagating modes and for maximal suppression of the unwanted coupling between modes rotating in the same direction.

An efficiency of the coupling between clockwise and counterclockwise modes, measured relatively other couplings, such as the coupling between clockwise and other clockwise modes, can be increased in case of use of specially configured resonators. For example, in case of close loop resonators, non-ring forms may be used, in particular forms with straight waveguide regions or undercurved waveguide regions. These regions may be at neighboring sides of neighboring resonators or they may be on external sides of neighboring resonators. An example of closed loop-based CRW configured with a reduced coupling between neighboring clockwise modes and/or an improved coupling between clockwise and their neighboring counterclockwise modes is shown in FIG. 10.

For seeing and quantifying the stop-band (the forbidden gap) effect, the inventors have developed general wave equations governing the fields of a non-relativistically rotating system, valid in the rotating system rest frame, which is non-inertial. Then, the tight-binding approach for solving the obtained equations was employed, to characterize the propagation in the rotating CRW. The CRW can be made of ring resonators or PhC micro-cavities or resonators of other type.

General wave equations have been developed, as follows. The medium was assumed to slowly rotate around a z axis at an angular radian velocity $\Omega$:

$$\Omega = \hat{z}\Omega. \qquad (2.1)$$

The assumption of slow rotation implies that (i) The angular velocity $\Omega$ and a PhC maximal dimension L satisfy $|\Omega L| \ll c$. Therefore no relativistic effects take place.

(ii) Consistent with the slow velocity assumption, no geometrical transformations or deformations take place. Thus, for example, the $\nabla$ operator is conserved; $\nabla = \nabla'$. For the very same reason, time is invariant in both systems: t=t'.

According to a formal structure of electrodynamics, postulated in such fundamental sources as [8, 9], the basic physical laws governing the electromagnetic fields are invariant under any coordinate transformation, including a non-inertial one. The transformation to a rotating system is manifested only by an appropriate change of the constitutive relations. Therefore under the non-relativistic rotation assumption discussed above, the source free Maxwell's equations in the rotating frame R are given by [8, 9]:

$$\nabla \times E = i\omega B, \quad \nabla \cdot B = 0 \qquad (2.2a)$$

$$\nabla \times H = -i\omega D, \quad \nabla \cdot D = 0 \qquad (2.2b)$$

Here $\omega$ is a frequency of an oscillating electromagnetic signal (i.e. of a mode). Time-dependence $e^{-i\omega t}$ of fields is implicit.

Let the material properties at rest be given by $\in(r) = \in_0 \in_r(r)$, $\mu = \mu_0$, where $\in_r(r)$ the (time-invariant) relative dielectric property of a stationary medium, as measured in its (inertial) rest frame. Then, up to the first order in velocity, the constitutive relations in R take a form ([8]):

$$D = \in E - c^{-2}\Omega \times r \times H \qquad (2.3a)$$

$$B = \mu H + c^{-2}\Omega \times r \times E \qquad (2.3b)$$

Here c is the speed of light in vacuum. This set of Maxwell's equations was used in the past as the starting point for studies of Sagnac effect in classic works on optical gyroscopes, for example in work [10].

The inventors derived a wave equation governing the magnetic field, by substituting the above constitutive relations into Maxwell's equations (2.2a)-(2.2b). The result is $$D \times E = i\omega \mu H \qquad (2.4a)$$

$$D \times H = -i\omega \in E \qquad (2.4b)$$

where D is an operator $$D \equiv \nabla - ik\beta(r), k = \omega/c, \beta(r) = c^{-1}\Omega \times r \qquad (2.5)$$

Then, in the procedure for finding magnetic field H, operator D replaces operator $\nabla$. The resulting equation is $D \times (1/\in_r) D \times H = k^2 H$. By collecting terms of the first order with respect to velocity and rearranging the terms, the inventors have ended up with the wave equation in a form valid in the rotating medium rest frame. The equation governs the behavior of magnetic field $H_\Omega(r)$:

$$\Theta H_\Omega(r) = k^2 H_\Omega(r) + ik L_\Omega H_\Omega(r). \qquad (2.6a)$$

Here, $\Theta$ is a wave operator associated with the entire structure $$\Theta \equiv \nabla \times \frac{1}{\varepsilon_r(r)} \nabla \times \qquad (2.6b)$$

and $L_\Omega$ is a rotation-induced operator $$L_\Omega H = \nabla \times \frac{\beta(r)}{\varepsilon_r(r)} \times H + \frac{\beta(r)}{\varepsilon_r(r)} \times \nabla \times H, \beta(r) = \Omega \times r/c. \qquad (2.6c)$$

In developing Eqs. (2.6a)-(2.6c), only terms up to first order in $\beta$ were kept. If no rotation takes place, operator $L_\Omega$ vanishes (i.e. turns into zero) and Eq. (2.6a) becomes reduced to the well-known stationary medium wave equation.

The inventors have solved Eq. (2.6a) for an entire CRW for slow rotation rates (for example including frequencies $\Omega \leq 1$ rad/sec, typical for optical gyroscopes). For CRWs consisting of weakly coupled resonators, the tight binding approach provided a convenient solution technique. The inventors have modified the rotating-CRW solution technique presented in [1], so as to properly handle the micro-cavities mode-degeneracy. Using the general above properties (iii)-(iv), and an assumption that a clockwise rotating mode in a given resonator couples only to the counter-clockwise rotating mode of its neighbor, the total field of the rotating system was expanded into the modes $H_\Omega^\pm$ $$H_\Omega = \sum_m A_m H_m(r), H_m(r) = \begin{cases} H_\Omega^+(r - r_m) & m \text{ even} \\ H_\Omega^-(r - r_m) & m \text{ odd} \end{cases} \qquad (2.7)$$

where $r_m$ is the location of the m-th resonator center. In this representation of the solution, the modal fields $H_\Omega^\pm$ are used as building blocks. The fact that they satisfy Eq. (1.4) can be exploited. The inter-cavity coupling in this model is presumed to be weak. This coupling, as well as the effect of rotation, is manifested via the expansion coefficients $A_m$, which are determined below.

The inventors have decomposed the relative dielectric property $\in_r(r)$ of the entire structure to a contribution $\in_b(r)$ of a background structure a contribution of a series of resonators. In the example, in which CRW is realized by an array of local defects in the perfect photonic crystal, the role of the background structure is played by a perfect photonic crystal (without the resonators).

Thus, $1/\in_r(r)$ in Eq. (2.6b) can be expressed as $$\frac{1}{\varepsilon_r(r)} = \frac{1}{\varepsilon_b(r)} + \sum_k d(r, r_k) \qquad (2.8a)$$

where $d(r,r_k)$ is a contribution to $1/\in_r$ introduced by the k-th resonator or local defect $$d(r, r_k) = \frac{1}{\varepsilon_d(r - r_k)} - \frac{1}{\varepsilon_b(r)}. \quad (2.8b)$$

Here $\in_d(r)$ represents the perfect background with a single resonator or a local defect, located at the origin. With this decomposition the operator $\Theta$ can be expanded into a series of operators, representing the contribution of the background structure and of each of the resonators (or local defects) separately:

$$\Theta = \Theta^b + \sum_k \Theta_k \quad (2.9a)$$

where $$\Theta^b = \nabla \times \frac{1}{\varepsilon_b(r)} \nabla \times, \quad (2.9b)$$
$$\Theta_k = \nabla \times d(r, r_k) \nabla \times$$

Due to the property (ii) of the previous section and to the Eq. (1.4), each of the summed modes $H_m$ in Eq. (2.7) satisfies $$(\Theta^b + \Theta_m)H_m = \left(\frac{\omega_0}{c}\right)^2 H_m. \quad (2.10)$$

To obtain a solution for the rotating CRW, Eq. (2.7) can be solved for the expansion coefficients $A_m$. It should be noted, that Eq. (2.6a) is not self-adjoint, thus the standard variational procedure for determining the set of $A_m$ is not useful here. Instead, the inventors have adopted the projection approach, similar to that used in [1]. The expansion of Eq. (2.7) is first substituted into the wave equation (2.6a); then an inner product of the result with $H_n$ is taken (index n sweeps over all involved resonators). This yields a residual error, associated with the solution, being orthogonal to the solution building blocks. The result is the following algebraic set of equations for the coefficients $A_m$:

$$\sum_m A_m \langle \Theta H_m, H_n \rangle = k^2 \sum_m A_m \langle H_m, H_n \rangle + ik \sum_m A_m \langle L_\Omega H_m, H_n \rangle. \quad (2.11)$$

Here $\langle F, G \rangle$ is an inner product $$\langle F,G \rangle = \int F \cdot \overline{G} d^3 r, \quad \langle F,F \rangle = \|F\|^2 \quad (2.12)$$

where the overline denotes the complex conjugate, and $F \cdot \overline{G}$ is the standard scalar product between the two vectors F and G. Since the indices m, n indicate resonator locations, and since the modal fields in each resonator are assumed to be tightly confined, the first inner product in the right hand side of Eq. (2.11) can be approximated by $\delta_{mn}\|H_\Omega^+\|^2$. Using this approximation, substituting the operator decomposition in Eqs. (2.9a)-(2.9b) into Eq. (2.11), and using Eq. (2.10), the following set of equations is obtained:

$$(k_0^2 - k^2)\|H_\Omega^+\|^2 A_n + \sum_m \tau_{m-n} A_m - ik \sum_m \langle L_\Omega H_m, H_n \rangle A_m = 0. \quad (2.13)$$

Here $\tau_{m-n}$, obtained and used in other studies pertaining to tight-binding analysis of stationary CRWs [1, 11, 12] is given by $$\tau_{m-n} = \left\langle \sum_{k \neq m} \Theta_k H_m, H_n \right\rangle. \quad (2.14)$$

It has been shown in [11] that for m−n≠±1 these elements are exponentially small when compared to the dominant elements $\tau_1 = \tau_{-1}$.

Finally, the inner products in the rightmost sum in Eq. (2.13) can be simplified. Using steps similar to those used in a previous work on the subject [1], though with a certain generalization needed in the present case (in [1] the modes were assumed to be real), the inventors have obtained:

$$\langle L_\Omega H_m, H_n \rangle = ic^{-1}\Omega\omega_0 \in_0 \langle \rho\hat{\phi}, \overline{H}_m \times E_n + H_n \times \overline{E}_m \rangle \quad (2.15)$$

This quantity is independent of the origin location (and rotation axis) with respect to the cavity location. The modal fields $E_m$, $H_m$ are tightly localized within the m-th cavity, and decay exponentially away from it. Thus, under the tight binding approximation the last equation yields $$\langle L_\Omega H_m, H_n \rangle \to \begin{cases} 0, & m \neq n \\ -i2\Omega k_0 \varepsilon_0 \langle \rho\hat{\phi}, \Re e S_m \rangle, & m = n \end{cases} \quad (2.16)$$

where $S_m$ is the Poynting vector carried by the rotation eigenmode in the m-th cavity, $$S_m E_m \times \overline{H}_m = -S_{m-1} = (-1)^m S_0. \quad (2.17)$$

The alternating behavior follows from the definition of $E_m$, $H_m$ in Eq. (2.7) and from the fact that the modal fields ($E_\Omega^+$, $H_\Omega^+$) rotate in opposite direction to the modal fields ($E_\Omega^-$, $H_\Omega^-$). The m=n elements of Eq. (2.16) can now be rewritten as $$\langle L_\Omega H_m, H_n \rangle = 2ic^{-1}\|H_\Omega^+\|^2(-1)^m \delta\omega(\Omega),$$
$$\delta\omega(\Omega) = -\Omega\omega_0 \in_0 \langle \rho\hat{\phi}, \Re e S_m \rangle, \quad (2.18)$$

where, surprisingly, the quantity $\delta\omega(\Omega)$ is identical to the frequency splitting of doubly-degenerate modes in a single (completely isolated) rotating microcavity [4] (and it has also been shown that this expression may be reduced to the classical Sagnac effect if the micro-cavity consists of a simple closed loop).

Collecting and substituting the results into the matrix equation in (2.13) (assuming that the operating frequency ω is sufficiently close to the stationary cavity resonance $\omega \approx \omega_0$, so that $\omega_0^2 - \omega^2 \approx 2\omega_0(\omega_0 - \omega)$ holds), the following equation was obtained:

$$\frac{\Delta\omega}{2}(A_{n-1} + A_{n+1}) + (-1)^n \delta\omega(\Omega)A_n = (\omega - \omega_0)A_n \quad (2.19a)$$

where $\nabla\omega$ is the stationary CRW bandwidth given by $$\Delta\omega = \frac{c^2\tau_1}{\omega_0\|H\Omega^+\|^2}. \quad (2.19b)$$

The last result can be rewritten as a matrix equation:

$$\begin{pmatrix} \vdots & \vdots & \vdots & \vdots & \vdots & \vdots & \vdots \\ \cdots & 0 & 0.5 & \frac{\delta\omega(\Omega)}{\Delta\omega} & 0.5 & 0 & \cdots \\ & \cdots & 0 & 0.5 & -\frac{\delta\omega(\Omega)}{\Delta\omega} & 0.5 & 0 & \cdots \\ & & \cdots & 0 & 0.5 & \frac{\delta\omega(\Omega)}{\Delta\omega} & 0.5 & 0 & \cdots \\ & & & \cdots & 0 & 0.5 & -\frac{\delta\omega(\Omega)}{\Delta\omega} & 0.5 & 0 & \cdots \\ & & & & \vdots & \vdots & \vdots & \vdots & \vdots & \vdots \end{pmatrix} \quad (2.20)$$

$$A = \frac{\omega - \omega_0}{\Delta\omega}A$$

This equation is an eigenvector/eigenvalue problem for the vector of coefficients $A_n$, and for the eigenfrequency $\omega$ of the entire CRW (more precisely, the normalized distance of $\omega$ from the stationary single cavity resonance $\omega_0$). For stationary CRWs ($\Omega=0$) Eq. (2.18) yields $\delta\omega(\Omega)=0$, and the equation Eq. (2.20) reduces to the well known eigenvalue problem considered for example in [11] and chapter 4 of [13]. Expressing the eigenvector elements $A_n$ as $$A_n = A_0 e^{i\beta n} \quad (2.21)$$

the resting CRW dispersion relation was obtained, which is of the form:

$$\omega = \omega_0 + \Delta\omega\cos(\beta). \quad (2.22)$$

For the rotating CRW, it is seen from Eq. (2.19a) that the mode degeneracy causes a rotation induced modulation $(-1)^n \delta\omega(\Omega)$ of the matrix coefficients. That equation thus has periodic coefficients, the magnitude of whose modulation is linearly-dependent on the rotation angular speed $\Omega$, with a proportionality factor that depends on the properties of the individual (in this example doubly-degenerate) micro-cavity. This yields the novel effect qualitatively discussed above: the periodic modulation opens a rotation-dependent gap in the center of the CRW transmission curve.

Figure 6:
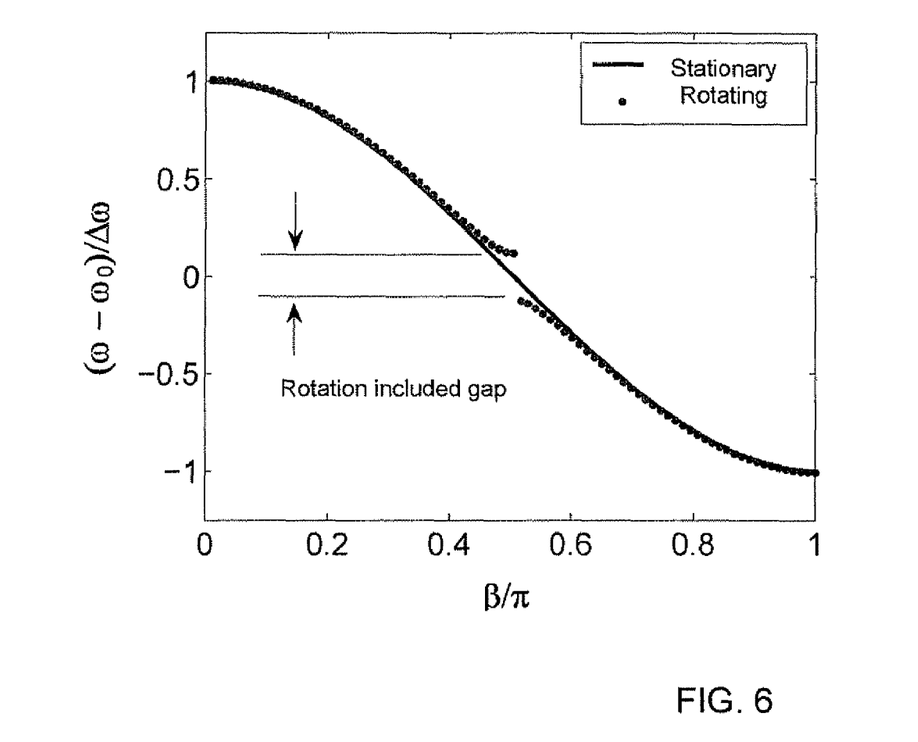
FIG. 6 illustrates an example of a normalized dispersion relation for resting and for rotating coupled resonator waveguide, the relation for the rotating coupled resonator waveguide features a stop-band.

Referring to FIG. 6 there are shown two exemplary curves—normalized dispersion relations for a resting (i.e. stationary) and a rotating CRW. For the rotating CRW, parameters were chosen so that an equality $\delta\omega(\Omega)=0.1\Delta\omega$ was held, and there was a good graphical resolution of the effect. By solving Eq. (2.20) for the eigenvalues, the inventors have found that a band-width $\Delta\omega_r$ of the rotation-dependent gap opened in the center of the CRW transmission curve coincides with the rotation-dependent splitting $$\Delta\omega_r 2\delta\omega(\Omega). \quad (2.23)$$

Furthermore, as the range above signifies the CRW's stopband, it is clear that an excitation of the structure by light of a frequency within this stop-band will result in an exponentially decreasing with distance signal. The rate of exponential decay depends on the distance of the excitation frequency from the stop-band edges, and increases with the rotation frequency $\Omega$ increase. This is demonstrated numerically further below,

EXAMPLE 2

As already noted, for $\delta\omega(\Omega)=0$ the matrix in Eq. (2.20) is reduced to a form in which the eigenvalues can be evaluated analytically. For N×N matrix, they are $\lambda_k=-\cos[k\pi/(N+1)]$, k=1, 2, . . . N [13]. This is a finite-length version of the dispersion relation in Eq. (2.22), which corresponds to the case of infinitely long CRW. In case of the presence on the diagonal of the alternating term $(-1)^n \delta\omega(\Omega)$, it "clears out" the eigenvalues from the interval $[-\delta\omega(\Omega), \delta\omega(\Omega)]$, and thus it opens a gap of forbidden frequencies: $\Delta\omega_r$ in Eq. (2.23). As it was mentioned above, FIG. 6 shows the dispersion curves for a resting and a rotating CRW; the curves were obtained by solving Eq (2.20) for 100 resonators, and angular velocity determined by the equality $\delta\omega(\Omega)/\Delta\omega=0.1$. The simulations were performed also for other values of $\delta\omega(\Omega)/\Delta\omega$, ranging from $10^{-5}$ to 0.5, and for a number of resonators N ranging from 30 to 1000, and the opening of the forbidden frequency gap with the width given by Eq. (2.23) was consistently observed.

It was considered that these (normalized) results hold for not only photonic crystal, but any CRW with mode degeneracy. One of the parameters characterizing a specific CRW is gap sensitivity; it is determined by the gap change dependence on rotation rate, in the simple case by the function $\Delta\omega_r(\Omega)/\Omega$. It should be understood, that this sensitivity is an intrinsic property of the individual micro-cavity. For the photonic crystal-based degenerate CRW discussed in above Example 1, the gap sensitivity is given by $2\delta\omega(\Omega)/\Omega=0.46$. The resting CRW bandwidth $\Delta\omega$ is determined mostly by the inter-cavity spacing (under tight binding approximation), and in principle it can be made arbitrarily small. Values of $\Delta\omega=10^{-5}\omega_0$ can be achieved by setting the inter-cavity spacing to about four crystal periods [12].

Figure 7:
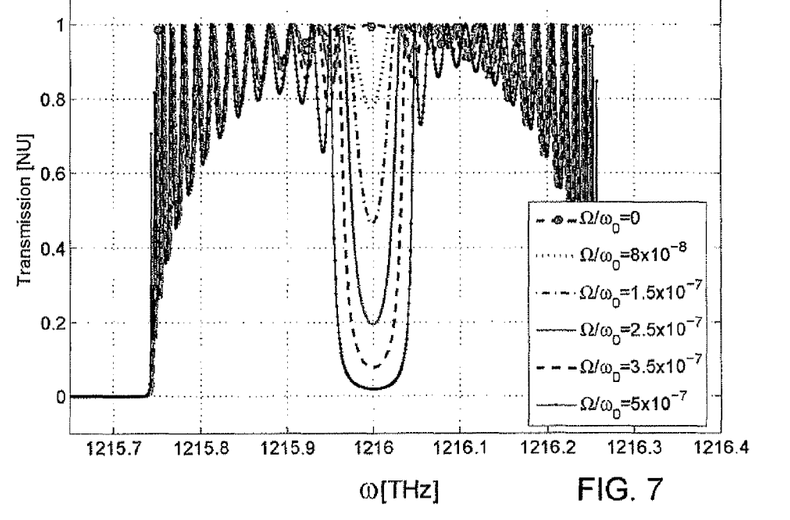
FIG. 7 shows an example of a changing normalized transmission spectrum for a coupled resonator waveguide (in this case ring resonator CRW) rotated with a changing rotation rate.
Figure 8:
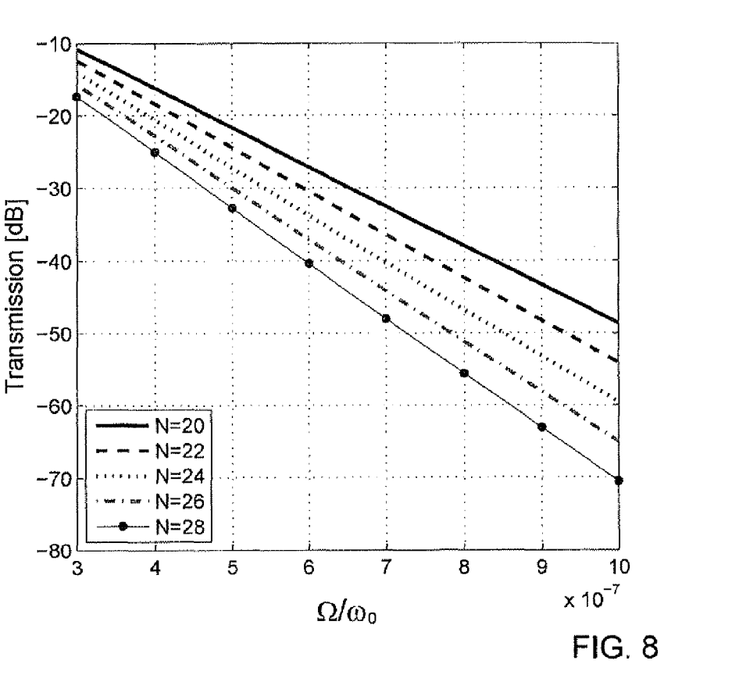
FIG. 8 shows an example of dependence of transmission at the center of the rotating degenerate-mode CRW stop-band on rotation speed, for various CRW lengths.

Referring to FIG. 7 there is examined the behavior of transmission curve of a finite length degenerate CRW as a function of rotation frequency $\Omega$, for several different values of the CRW length. The CRW was in a form of a line of resonators, as shown in FIG. 2; it consisted of 29 ring resonators with radius of 25 µm each, made of a dielectric material with $\in=2.25$. The rings are situated along a straight path, with inter-cavity coupling coefficient of $\kappa=0.01$ (by power). The CRW input and output terminals consisted of dielectric waveguides coupled, respectively, to the first ring on the left and to the last (rightmost) ring, both with coupling coefficient of 0.2 (power). At rest, the rings resonated at angular frequency $\omega_0=12.16\times10^{14}$ s$^{-1}$, which corresponded to angular mode #152 with a vacuum wavelength of 1.55 µm (ring length was 152 times larger than the wavelength). The splitting of each individual ring due to rotation is obtained here via the classical Sagnac effect, and is given by $\delta\omega(\Omega)67.5\Omega$. A numerical simulation of the rotating structure was carried out. This time the simulation relied on the transfer matrix approach [2]. The CRW transmission is shown in FIG. 7 as a function of light frequency $\omega$ for several values of rotation angular speed $\Omega$. As predicted, the rotation induces a stopband in the center of the transmission curve. The width of this band increases with the rotation speed $\Omega$, in accordance with Eq. (2.23), and it matches the relation $\Delta\omega_r \approx \delta\omega(\Omega)=67.5\Omega$. It is seen in FIG. 7 that the transmission values for light frequencies within this stop-band decrease rapidly as the rotation speed $\Omega$ increases. In FIG. 8 there is shown the transmission at the center of the rotating CRW stop-band, as a function of rotation speed $\Omega$, for several different CRW lengths. It is seen that the transmission decreases exponentially with $\Omega$. The exponential decay rate increases as the length of the CRW increases: for a CRW with a certain number of resonators this rate can be determined by the slope of the respective straight line in FIG. 8 whose vertical axis (transmission) is shown on a logarithmic scale. Owing to the nature of the stop-band exponential decay, the transmission of a finite length CRW section, at the center of the stop band, can be expressed as $$T(\omega = \omega_0, \Omega) = e^{-\alpha \frac{\Omega}{\alpha_0} N} \quad (4.1)$$

where α is a proportionality coefficient that depends of the CRW generic properties (micro-resonator properties, inter-resonator coupling, etc. . . . ), and N is the total number of resonators.

Figure 9:
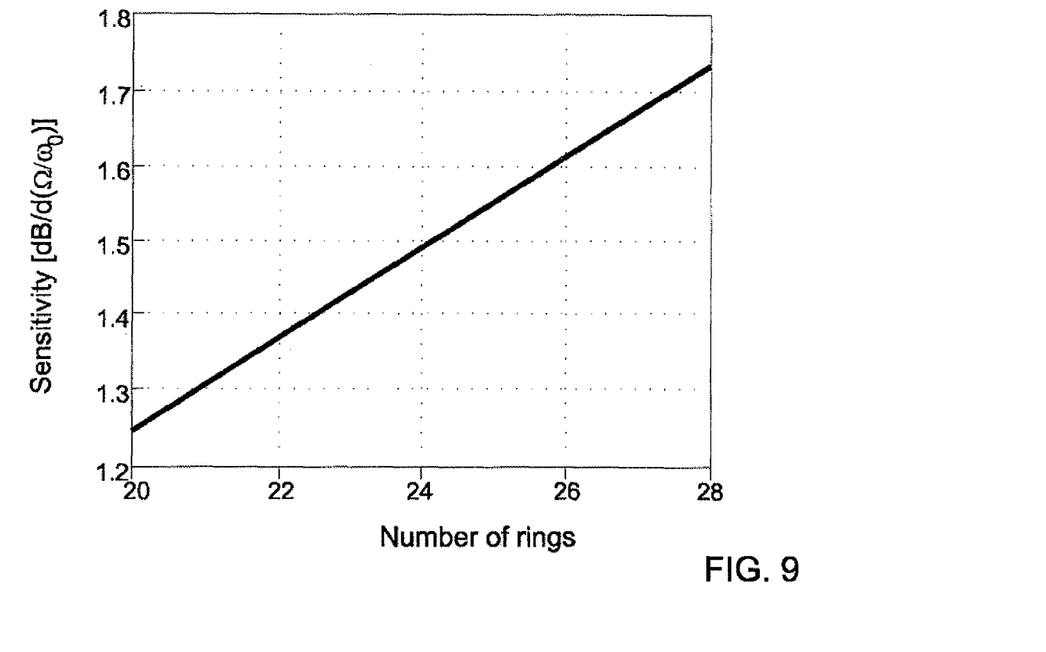
FIG. 9 shows an example of exponentially increasing sensitivity of a degenerate-mode CRW to rotation, as a function of the CRW number of resonators.

The sensitivity of the transmission defined by Eq. (4.1) can be determined as $dT/d(\Omega/\omega_0)/T$. A graph of the sensitivity is illustrated in FIG. 9. The exponential sensitivity for rotation is linearly dependent on the number of resonators. The performance of the CRW is independent of the general trace formed by the entire CRW; but is dependent on the single micro-cavity properties and the total number of micro-cavities. This observation allows flexibility for filling the cavities with a single-layer chip or multi-layer chip.

Further Applications of the Degenerate-Mode CRW Having a Stop-Band:

The inventors have considered several applications for the degenerate-mode CRW having a stop band. These applications include a switch, a filter, and a gyroscope. Light switching can be realized, for example for a single frequency, such as the center frequency of stop-band or another frequency in the resting CRW transmission band, or for a range of frequencies, for example all frequencies of the transmission band. In some embodiments, light switching can be performed by an optical unit or device which includes a laser, emitting light of a frequency being close (e.g. within 10%) to the central resonant frequency of the CRW, and the CRW itself. Such an optical unit, as it is clear from above, can be used also as a part of gyroscope. If light switching is needed for all frequencies of the transmission band, the CRW is rotated at such a frequency, at which the stop-band exceeds the transmission band. The resulting non-transmitting, but adjustable, waveguide, is useful by itself, since the transmission may be switched on by decelerating the waveguide's rotation.

Parameters of the CRW can be selected for an efficient use of chip area. The CRW can have a straight segment of more than two resonators. The CRW can be in a form of straight line. The CRW can have an even number of resonators. For example, it can be then conveniently folded. The CRW can be an open circuit (i.e. not a closed loop), allowing light input and light output from and to different devices and/or in different directions. Parameters $\omega_0$, α, N of the CRW can be selected, so as to enable a desired transmission (transparency) reading at a certain angular velocity and light frequency.

Light filtering can be especially effective for frequencies being relatively remote from the edge of the transmission band and the edge of the stop-band. For example, light filtering can be effective for a frequency in any of two 20% band-width intervals in the transmission band situated about 15% of bandwidth away from the respective edges of the transmission band (these intervals are thereby separated by a central 30% width interval of the transmission band).

Clearly, rotation may, for at least one light frequency, decrease a transmission coefficient through the waveguide at least five times relative to this coefficient at waveguide rest.

Further, the transmission coefficient may be decreased at least twenty times or at least one hundred times by rotating the waveguide with appropriate rotation rates.

The CRW can be equipped with a controller, which would rotate the CRW with a constant angular velocity, and thus create a desired band structure in the CRW. The controller itself may be adapted to be controllable, so that there will be an option to choose the angular velocity. The controller may be operable to sweep through a range of angular velocities.

The CRW can also be equipped with a light detector at the output, and a processing unit (e.g. a preprogrammed general purpose computer), which can be configured for calculation of the CRW transparency, and/or the CRW rotation rate, based on the light detector reading, and input light spectral distribution.

The CRW can be implemented as a chain of micro-cavities or defects in a photonic crystal, micro-rings, or other type resonators.

The inventors further considered that the degenerate resonance frequencies of the individual resonators of the CRW do not need to be substantially equal at rest, but can be selected to be periodically distributed along the CRW, with a period of two resonators. The splitting effect will thus tend to shift coupling clockwise and counter-clockwise modes toward each other, for at least one direction of light propagation along the waveguide. When the rotation rate of the CRW is sufficiently high, these modes can become of the same frequency. The CRW transmission in this direction would thereby peak at a certain rotating frequency. This effect can be used for maximizing measurement or minimizing losses of light around this certain rotating frequency, or it can be used for efficient filtering or switching of light around this frequency.

Those skilled in the art will readily appreciate that various modifications and changes can be applied to the embodiments of the invention as hereinbefore described without departing from its scope defined in and by the appended claims.

The invention claimed is:

1. A waveguide comprising a plurality of coupled evenly degenerate split mode resonators, each of the split mode resonators having a shape providing at least two modes of different resonant frequencies, said modes being joinable into a substantially degenerate mode by setting substantially zero rotation rate of the resonator, shiftable towards or away from each other by a change in a magnitude of the rotation rate, the split of the modes thereby forming a stop band in a resonant band of the waveguide affectable by a change in an angular velocity of the waveguide while a vector of the angular velocity is non-parallel with respect to the waveguide.

2. The waveguide of claim 1, wherein at least one of the plurality of split mode resonators is of an optical size smaller than five wavelengths of the substantially degenerate mode.

3. The waveguide of claim 2, wherein said at least one resonator is of an optical size being between five and three wavelengths of the substantially degenerate mode.

4. The waveguide of claim 2, wherein said at least one resonator is of an optical size being between three wavelengths of the substantially degenerate mode and one wavelength of the substantially degenerate mode.

5. The waveguide of claim 2, wherein said at least one resonator is of an optical size being smaller than one wavelength of the substantially degenerate mode.

6. The waveguide of claim 2, wherein said at least one resonator is a defect in a photonic crystal.

7. The waveguide of claim 1, wherein said shape of each of the resonators is selected such that the even degeneracy of said resonators equals two.

8. The waveguide of claim 1, wherein said plurality of coupled evenly degenerate split mode resonators comprises at least one resonator which is a defect in a photonic crystal.

9. The waveguide of claim 1, wherein each of said split mode resonators is shaped as a closed-loop resonator.

10. The waveguide of claim 1, wherein each of said split mode resonators is shaped as a ring resonator.

11. The waveguide of claim 1, wherein each of said split mode resonators is shaped as a disc resonator.

12. The waveguide of claim 1, wherein a degeneracy number of said split mode resonators is two.

13. The waveguide of claim 1, wherein said waveguide forms an open circuit.

14. The waveguide of claim 1, wherein said waveguide has an even number of resonators.

15. The waveguide of claim 1, wherein said waveguide has a straight segment of more than two resonators.

16. The waveguide of claim 1, wherein said waveguide is of a straight line shape.

17. The waveguide of claim 1, the plurality of resonators comprises at least a pair of resonators configured to have an enhanced coupling between clockwise and counter-clockwise propagating modes, the enhancement being considered relative to a ring resonator of the same size as resonators of said pair.

18. The waveguide of claim 1, the plurality of resonators comprising at least a pair of resonators with parallel segments in a region of the coupling between them.

19. The waveguide of claim 1, the plurality of resonators comprising at least a pair of resonators with curved segments which curvatures are smaller in a region of the coupling between the resonators than in other regions.

20. A device, comprising the waveguide of claim 1 and a light source configured to emit light and input light into said waveguide.

21. The device of claim 20, wherein the light source is configured to emit light of changing frequency.

22. A device, comprising the waveguide of claim 1 and a light detector configured to detect an intensity of light passed through the waveguide.

23. A device, comprising the waveguide of claim 1 and a rotation controller configured to rotate the waveguide.

24. A device, comprising the waveguide of claim 1 and a processing unit, adapted to calculate the waveguide transparency and/or the waveguide rotation rate, based on an intensity of light at an output of said waveguide and on an input light spectral distribution.

25. A gyroscope comprising the waveguide of claim 1.

26. An optical switch comprising the waveguide of claim 1, wherein the degenerate modes form a forbidden gap fully covering a rest resonant band of the waveguide, the formed forbidden gap decreasing to less than said rest resonant band under a certain change in rotation rate.

27. The optical switch of claim 26, wherein the even degeneracy of said resonators equals two.

28. The optical switch of claim 26, wherein the plurality of said split mode resonators comprises at least one resonator being a defect in a photonic crystal.

29. The optical switch of claim 26, wherein each of said split mode resonators is shaped as a closed-loop resonator.

30. The optical switch of claim 26, wherein each of said split mode resonators is shaped as a ring resonator.

31. The optical switch of claim 26, wherein each of said split mode resonators is shaped as a disc resonator.

32. The optical switch of claim 26, wherein a degeneracy number of said split mode resonators is two.

33. The optical switch of claim 26, wherein said waveguide forms an open circuit.

34. The optical switch of claim 26, wherein said waveguide has an even number of resonators.

35. The optical switch of claim 26, wherein said waveguide has a straight segment of more than two resonators.

36. The optical switch of claim 26, wherein said waveguide is of a straight line shape.

37. The optical switch of claim 26, wherein the plurality of resonators comprises at least a pair of resonators configured to have an enhanced coupling between clockwise and counter-clockwise propagating modes, the enhancement being considered relative to a ring resonator of the same size as resonators of said pair.

38. The optical switch of claim 26, wherein the plurality of resonators comprises at least a pair of resonators with parallel segments in a region of the coupling between them.

39. The optical switch of claim 26, wherein the plurality of resonators comprises at least a pair of resonators with curved segments which curvatures smaller in a region of the coupling between the resonators than in other regions.

40. A device, comprising the optical switch of claim 26 and a light source configured to emit light and input light into said waveguide.

41. The device of claim 40, wherein the light source is configured to emit light of changing frequency.

42. A device, comprising the optical switch of claim 26 and a light detector configured to detect an intensity of light passed through the waveguide.

43. A device, comprising the optical switch of claim 26 and a rotation controller configured to rotate the waveguide.

44. A device, comprising the optical switch of claim 26 and a processing unit, adapted to calculate the waveguide transparency and/or the waveguide rotation rate, based on an intensity of light at an output of said waveguide and on an input light spectral distribution.

45. A method for affecting wave propagation in the waveguide of claim 1, the method comprising rotating the waveguide so as to produce a stop-band within a transmission band of said waveguide, said rotation causing a change in a transmission coefficient for at least one light frequency to become at least five times smaller than a transmission coefficient for said frequency at rest.

46. The method of claim 45, said transmission coefficient being at least twenty times smaller than at rest.

47. The method of claim 46, said transmission coefficient being at least a hundred times smaller than at rest.

* * * * *